(12) United States Patent
Bell et al.

(10) Patent No.: US 7,492,997 B2
(45) Date of Patent: Feb. 17, 2009

(54) FIBER OPTIC DROP RIBBON, SYSTEM, AND ASSOCIATED METHOD

(75) Inventors: George N. Bell, Stormville, NY (US); Richard D. Pinsonneault, Park City, FL (US); John L. Carey, Jr., Haymarket, VA (US); Kevin N. Smith, Phillipsburg, NJ (US); William R. Belben, Belle Mead, NJ (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 11/769,340

(22) Filed: Jun. 27, 2007

(65) Prior Publication Data

US 2009/0003782 A1 Jan. 1, 2009

(51) Int. Cl.
*G02B 6/44* (2006.01)
(52) U.S. Cl. ...................... 385/114; 385/100
(58) Field of Classification Search ............. 385/100, 385/114
See application file for complete search history.

(56) References Cited

U.S. PATENT DOCUMENTS 4,147,407 A * 4/1979 Eichenbaum et al. ....... 385/141

* cited by examiner

*Primary Examiner*—Jennifer Doan

(57) ABSTRACT

A fiber optic drop ribbon is described that can be attached to structures, such as the walls of multi-dwelling units (MDUs), for connecting subscribers to a fiber optic communications network. A number of coated optical fibers are supported by a backing strip of the article having a first and second surface. The first surface is attached to the structure, and the optical fibers are attached to the second surface. A cover strip attaches to the second surface of the backing strip to cover the optical fibers. The cover strip may be removable to provide access to the optical fibers and may reattach to the backing strip following removal. Associated systems and methods are also provided that may include additional components, such as furcation sections, furcation splints, and fiber trays, to facilitate the installation of the article and the connection of subscribers to the fiber optic network.

21 Claims, 5 Drawing Sheets

FIBER OPTIC DROP RIBBON, SYSTEM, AND ASSOCIATED METHOD

BACKGROUND

As advances are made in the field of fiber optics and fiber optic networks continue to grow, the demand for access to such networks also increases. More and more people want to experience the benefits of subscribing to a fiber optic network, whether it is for telephone service, television programming, internet access, or any other type of access involving the transmission of voice, data, or video signals. Few, however, wish to look at bulky raceways or exposed cables that may connect them or neighboring subscribers to the fiber optic network.

Although the core of each optical fiber itself has a very small diameter, generally smaller than the diameter of a human hair, individual fibers must often be "built up" to produce a cable that can be handled effectively and efficiently and installed in various locations without adversely affecting the signal-carrying properties of the fiber. For example, the optical fiber core and cladding is usually coated with a buffer layer made of resin, and the buffer layer may be further surrounded by a jacket layer, which is typically made of plastic. Such layers, added to protect the fibers from at least transverse stresses, increase the effective diameter of each optical fiber. Furthermore, fibers are typically bundled together for connecting multiple subscribers in the same general location, such as an apartment building or other multi-dwelling unit, to the fiber backbone. In general, twelve fibers may be bundled together in a cable (known as a fiber optic drop cable) for connecting subscribers to the network.

In addition to the increased diameter resulting from protecting and bundling the optical fibers, guides and accessories may be needed to install the fibers in different locations, further increasing the effective size of the installation. For example, cables are sometimes installed in raceways, which may be plastic channels, that serve to guide, contain, and protect the cables.

In many cases, the fiber optic cable and accessories are considered unattractive or at least austere by residents of the multi-dwelling unit who see the fiber optic installations in their hallways. As a result, decorative moldings are typically installed to hide the fiber optic installations from the view of residents. Although decorative moldings are generally successful for hiding fiber optic installations, installing such moldings over the fiber optic cable raceways increases the cost of the fiber optic installation. In addition, installing the moldings adds an extra step to the fiber optic installation, resulting in longer installation times and greater inconvenience to the subscribers, such as the residents of the multi-dwelling unit where the installation is taking place.

Thus, there is a need for a fiber optic cable that is easy to install, is not bulky or obtrusive, can be easily adapted to match the installation environment, and is modifiable in the field for different types of installations.

BRIEF DESCRIPTION OF THE SEVERAL VIEWS OF THE DRAWING(S)

FIG. 4A is a cross-sectional view of the optical fibers at the offset of FIG. 4.

DETAILED DESCRIPTION

Exemplary embodiments now will be described hereinafter with reference to the accompanying drawings, in which exemplary embodiments and examples are shown. Like numbers refer to like elements throughout.

Articles, systems, and methods for connecting subscribers to a fiber optic communications network are provided in accordance with various exemplary embodiments. In general, articles, systems and methods are described for using and installing a fiber optic drop cable in the form of a ribbon in structures, such as multi-dwelling units (MDUs), to provide subscribers, such as residents of the MDUs, with access to the fiber optic network. By using a ribbon-like structure to support the optical fibers, smaller diameter fibers may be used in the drop cable, thereby reducing the size of the molding that may be installed over the drop cable and reducing installation costs.

Figure 1:
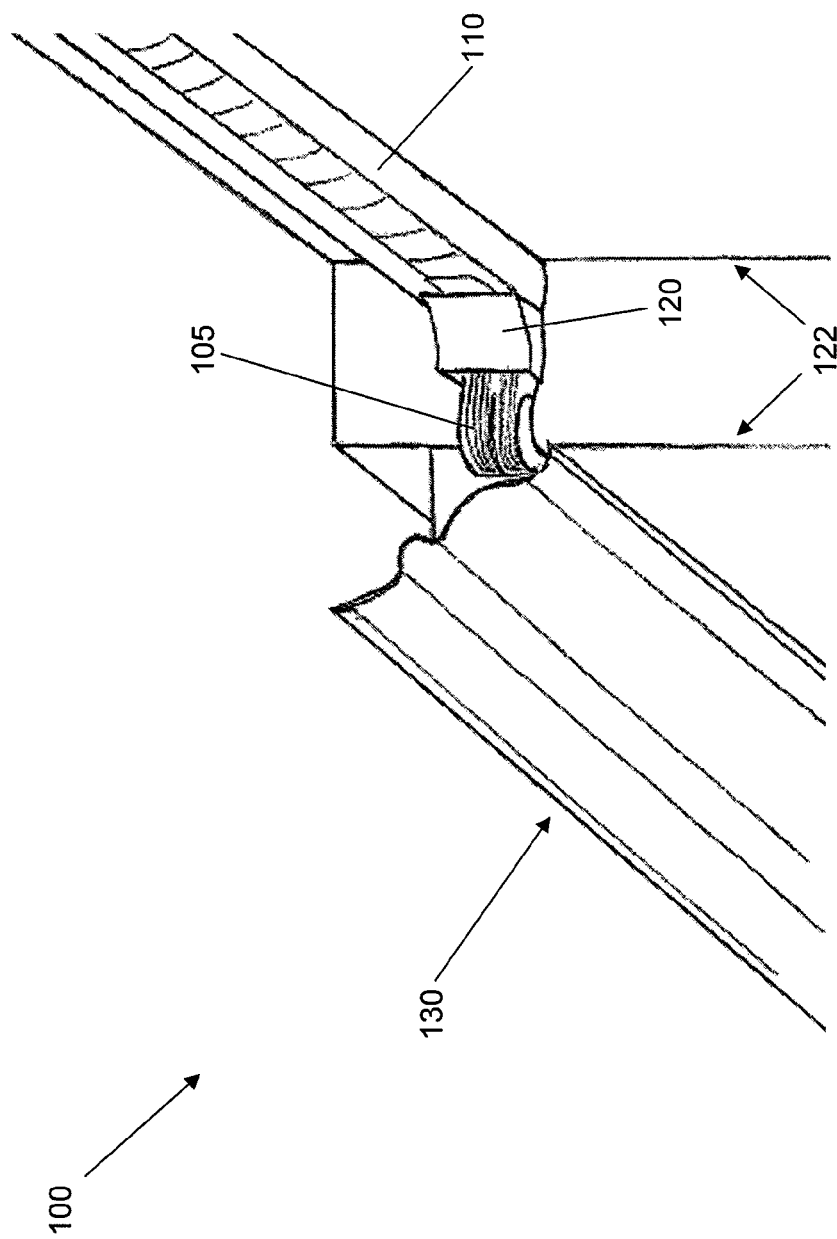
FIG. 1 is a perspective view of an exemplary fiber optic drop cable installation.

FIG. 1 illustrates a fiber optic drop cable installation 100. The drop cable installation 100 includes a number of optical fibers 105, shown exposed in FIG. 1 for illustration purposes. The installation 100 may also include accessories such as a bend radius guide 120, which may serve to ensure that the optical fibers 105 do not bend at too great an angle, such as when the fibers 105 are being installed around corners 122. Too great a bend radius in this situation may cause significant signal attenuation, adversely affecting the quality of the signal received by the subscriber. Furthermore, a molding 130 may be installed over the optical fibers 105, and in some cases over one or more of the accessories, to hide aspects of the drop cable installation 100.

Figure 2A:
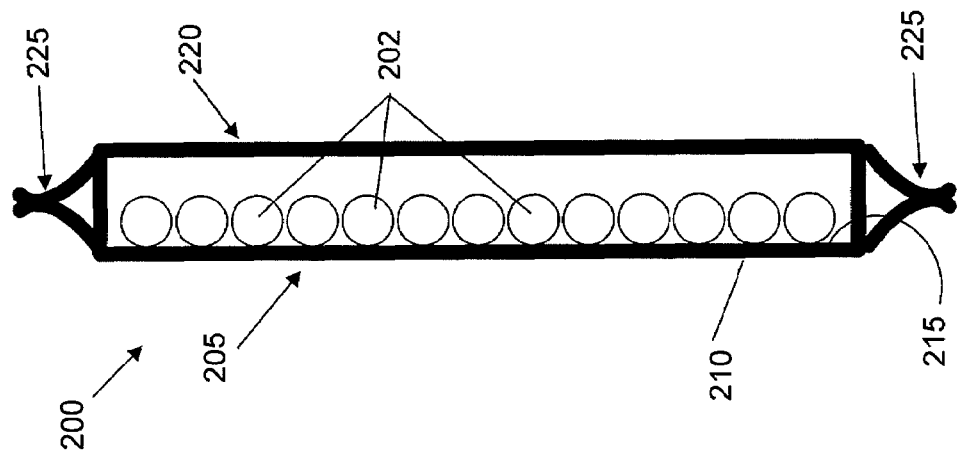
FIG. 2A is a cross-sectional view of the fiber optic drop ribbon of FIG. 2.
Figure 2:
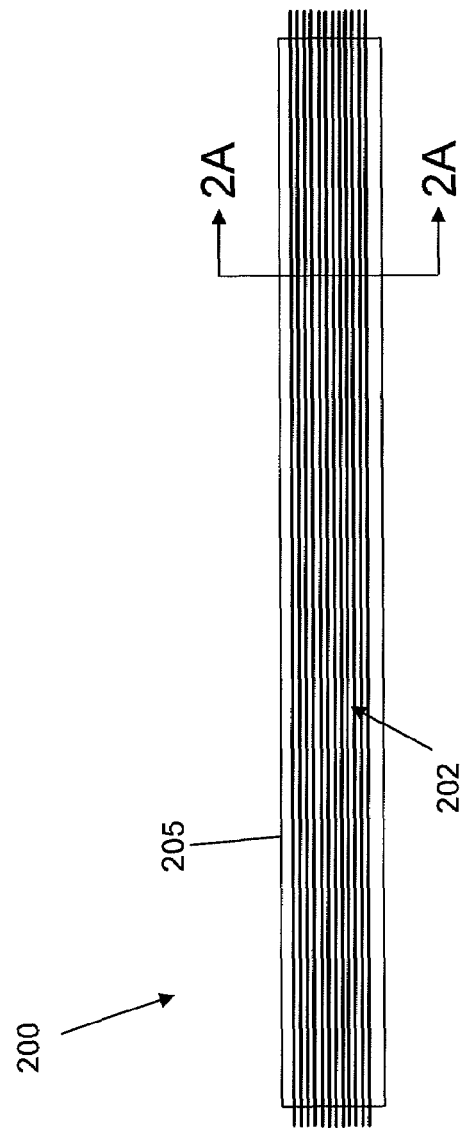
FIG. 2 is a plan view of a fiber optic drop ribbon according to one embodiment.

Referring to FIGS. 2 and 2A, a ribbon cable 200 is provided for connecting subscribers to a network. The ribbon cable 200 includes a backing strip 205 having a first surface 210 and an opposed, second surface 215, shown in the cross-sectional view of FIG. 2A. The backing strip 205 may be made of various materials, such as any flame-retardant, gum-based product, as well as other flexible materials that may possess suitable tensile strength to protect attached fibers from tensile forces. The first surface 210 of the backing strip 205 is configured to attach to a structure, such as a wall in an MDU or a fixture or device that is attached to the wall. For example, the first surface 210 may be coated with an adhesive or other substance to allow the first surface 210 to attach to the structure.

The ribbon cable 200 further includes a number of coated optical fibers 202 that are attached to the second surface 215 of the backing strip 205 and are supported by the backing strip 205. The fibers may be individually coated for protection, such as with a thin polymeric coating on each fiber, and the individual coated fibers may be attached in a side-by-side manner to the second surface 215 of the backing strip 205, as shown in FIG. 2. Alternatively, the fibers may be coated together such that the fibers are configured in a side-by-side manner within a common web, such as a common polymeric web. Although in the case of a common coating the fibers may be held together by the web, the web may be formed such that the web material between the fibers is thin enough to allow separation of the fibers if necessary, for example to detach one of the fibers from the rest of the fibers in the web. The optical fibers 202 may be attached to the second surface 215 of the backing strip 205 with an adhesive or other substance. For example, the backing strip 205 may include a double-sided adhesive tape such that one side of the adhesive tape forms the first surface 210 and may attach to the structure and the other side of the adhesive tape forms the second surface 215 to which the optical fibers 202 may be attached.

The ribbon cable 200 may further include a cover strip 220 configured to attach to the second surface 215 of the backing strip 205 such that the optical fibers 202 are disposed between the backing strip 205 and the cover strip 220. For example, the edges of the cover strip 220 (i.e., the portions of the cover strip 220 on either side of the optical fibers) may attach to the second surface 215 of the backing strip 205 at corresponding locations, such as through contact with an adhesive of the second surface 215. In this way, the cover strip 220 and the backing strip 205 may form at least a partial seal 225 along either side of the optical fibers 202, as shown in FIG. 2A. Furthermore, the optical fibers 202 of the ribbon cable 200 may have various diameters, depending on the application and the configuration of the fiber optic network. In some embodiments, each optical fiber 202 of the ribbon cable 200 may have a diameter of 900 µm, plus or minus an industry standard manufacturing tolerance, as known in the art.

The cover strip 220 may be made of any material that supports attachment to the second surface 215 of the backing strip 205 and provides at least some protection of the optical fibers 202. For example, the cover strip 220 may include a polyester film and/or cellophane. In addition, the cover strip 220 may be configured to be at least partially removable such that access may be provided to one or more of the optical fibers 202 disposed between the cover strip 220 and the backing strip 205. For example, the cover strip 220 may be configured such that it may be pulled away from or pulled off the backing strip 205 to expose one or more of the optical fibers 202. In some cases, the cover strip 220 may be configured to re-attach to the second surface 215 of the cover strip following at least partial removal of the cover strip 220. For instance, the cover strip 220 may be configured to peel away from the second surface 215 without disturbing the attachment properties (e.g., the adhesive properties) of the second surface 215 or the cover strip 220, for example to allow access to one or more of the optical fibers 202 of the ribbon cable 200. In this way, the cover strip 220 may be re-attached (e.g., re-adhered) to the second surface 215 after the cover strip 220 is peeled away, for example after access to the optical fibers 202 is no longer needed.

Figure 3:
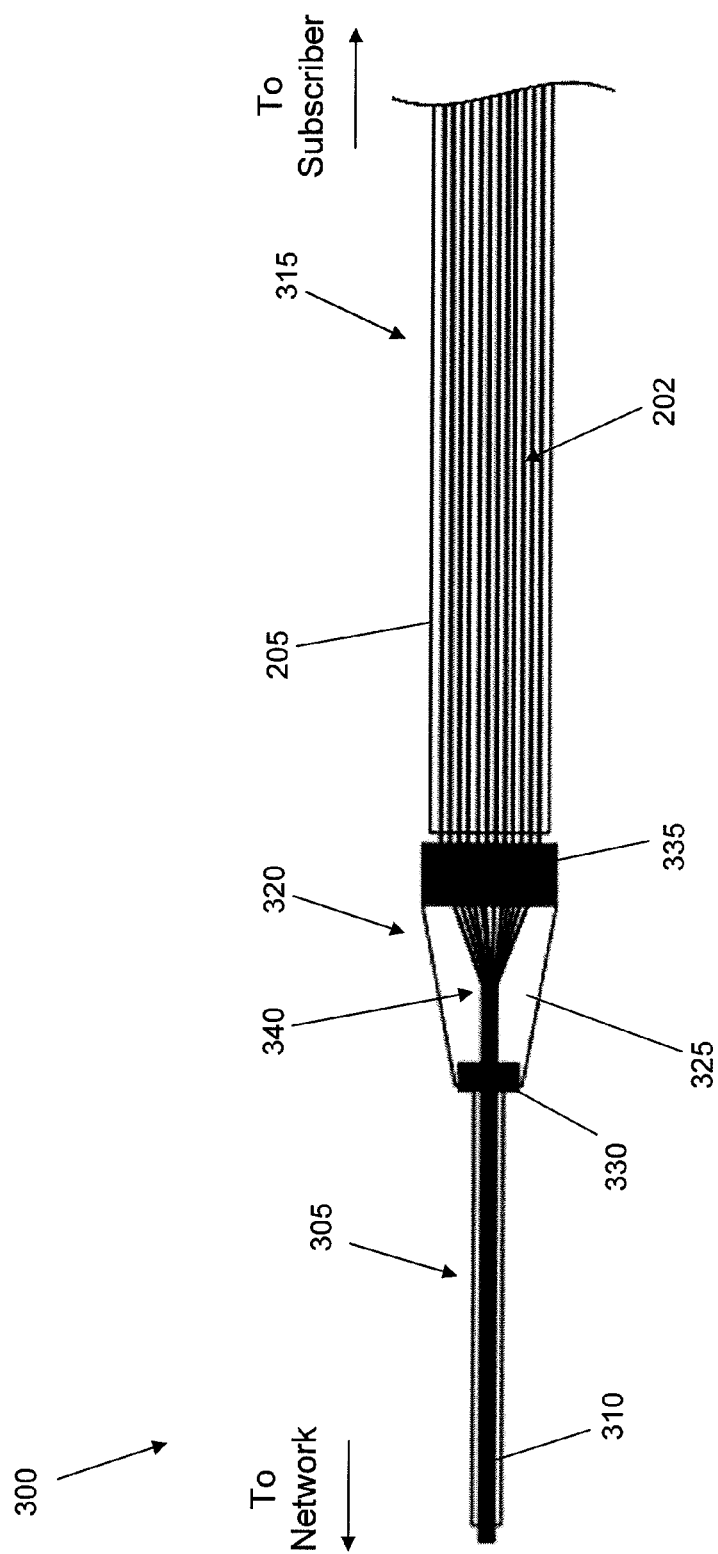
FIG. 3 is a plan view of a system according to one embodiment showing an upjacketed optical fiber bundle, a furcation section, and a fiber optic drop ribbon.

A system 300, illustrated in FIG. 3, is also provided for connecting subscribers to a fiber optic network. The system 300 includes an upjacketed optical fiber bundle 305 having one or more coated optical fibers 310 each having a first predefined diameter. For example, the upjacketed optical fiber bundle 305 may include twelve optical fibers 310 each having a diameter of 250 µm or less (e.g., 250 µm optical fibers or 125 µm optical fibers). The system 300 also includes a fiber optic drop ribbon 315 that is connected to the upjacketed optical fiber bundle 305. The fiber optic drop ribbon 315 includes a backing strip 205 and a number of coated optical fibers 202, each having a second predefined diameter. For example, the fiber optic drop ribbon 315 may include twelve optical fibers 202 each having a diameter of 900 µm. Furthermore, the backing strip 205 of the fiber optic drop ribbon 315 includes a first surface, configured to attach to a structure, and a second surface, to which the optical fibers 202 are attached, as previously discussed. In this way, the optical fibers 202 of the fiber optic drop ribbon 315 are supported by the backing strip 205.

The system 300 may include a furcation section 320 mechanically and optically connecting the upjacketed optical fiber bundle 305 to the fiber optic drop ribbon 315. The furcation section 320 may include a transitional backing strip 325 configured to at least partially support end portions of the one or more optical fibers 310 of the upjacketed optical fiber bundle 305 and the optical fibers 202 of the fiber optic drop ribbon 315. In addition, the furcation section 320 may include a first connector 330, configured to attach the furcation section 320 to the upjacketed optical fiber bundle 305, and a second connector 335, configured to attach the furcation section 320 to the fiber optic drop ribbon 315. In order to connect the optical fibers 310 of the upjacketed optical fiber bundle 305 with the optical fibers 202 of the fiber optic drop ribbon 315, one or more of the optical fibers 310 having a first diameter may be spliced to corresponding optical fibers 202 having a second diameter in the area of the furcation section 320. For example, the ends of the corresponding fibers may be fusion spliced, such as with an electric arc, or mechanically spliced. The furcation section 320 may thus be configured to support the spliced optical fibers 310, 202 at the location of the splice 340.

Although the transitional backing strip 325 may be configured in any shape, such as a square or a rectangle, in one embodiment the transitional backing strip 325 may have a generally trapezoidal shape. For example, one edge of the transitional backing strip 325, such as the edge parallel to and proximate the first connector 330, may be configured to be shorter than the opposite edge such that the width of the transitional backing strip 325 gradually increases from the first connector 330 to the second connector 335.

Furthermore, the first and second connectors 330, 335 may be configured in any shape and may comprise various materials suitable for supporting the connection of the upjacketed optical fiber bundle 305 with the furcation section 320 and the furcation section 320 with the fiber optic drop ribbon 315, respectively. For example, the first and second connectors 330, 335 may comprise heat shrunk bands. In particular, the first and second connectors 330, 335 may each include a band made of polyvinyl chloride or other heat shrinkable plastic. The band of the first connector 330 may be heat shrunk about one edge of the transitional backing strip 325 and the upjacketing of the upjacketed optical fiber bundle 305, and the second connector 335 may be heat shrunk about the opposite edge of the transitional backing strip 325 and the coated optical fibers 202 of the fiber optic drop ribbon 315, as illustrated in FIG. 3.

In order to connect subscribers to a fiber optic network, various equipment, devices, and other network components may be used to support the transmission of communication signals and provide connections between different parts of the communication pathway (i.e., the path a communication signal may travel between the network provider and the subscriber's equipment). For example, a Fiber Distribution Terminal (FDT) may be provided near a customer location, such as underground or on a utility pole outside a house or MDU, to allow subscribers to connect to the network. Thus, in some embodiments, the upjacketed optical fiber bundle 305 may be configured to be connected to an FDT. For example, each optical fiber 310 of the upjacketed optical fiber bundle 305 may be configured to be connected to the FDT using a Mechanical Transfer (MT) connector. In this way, all twelve optical fibers 310 (for example) may be terminated in the FDT using a single gauge connector. Alternatively, each optical fiber 310 of the upjacketed optical fiber bundle 305 may be configured to be connected to the fiber optic network using a Subscription Channel/Angled Physical Contact (SC/APC). The fibers of the upjacketed optical fiber bundle 305 may also be fusion spliced to corresponding fibers of the fiber optic network.

In some embodiments, the fiber optic drop ribbon 315 of the system 300 may include a cover strip 220 configured to attach to the second surface 215 of the backing strip 205, for example as shown in FIG. 2A. As mentioned above, the cover strip 220 may be made of polyester film, cellophane, or any other suitable materials including combinations of these materials. Furthermore, the cover strip 220 may be at least partially removable and may be configured to provide access to at least one of the optical fibers 202 of the fiber optic drop ribbon 315, as previously described.

Figure 4:
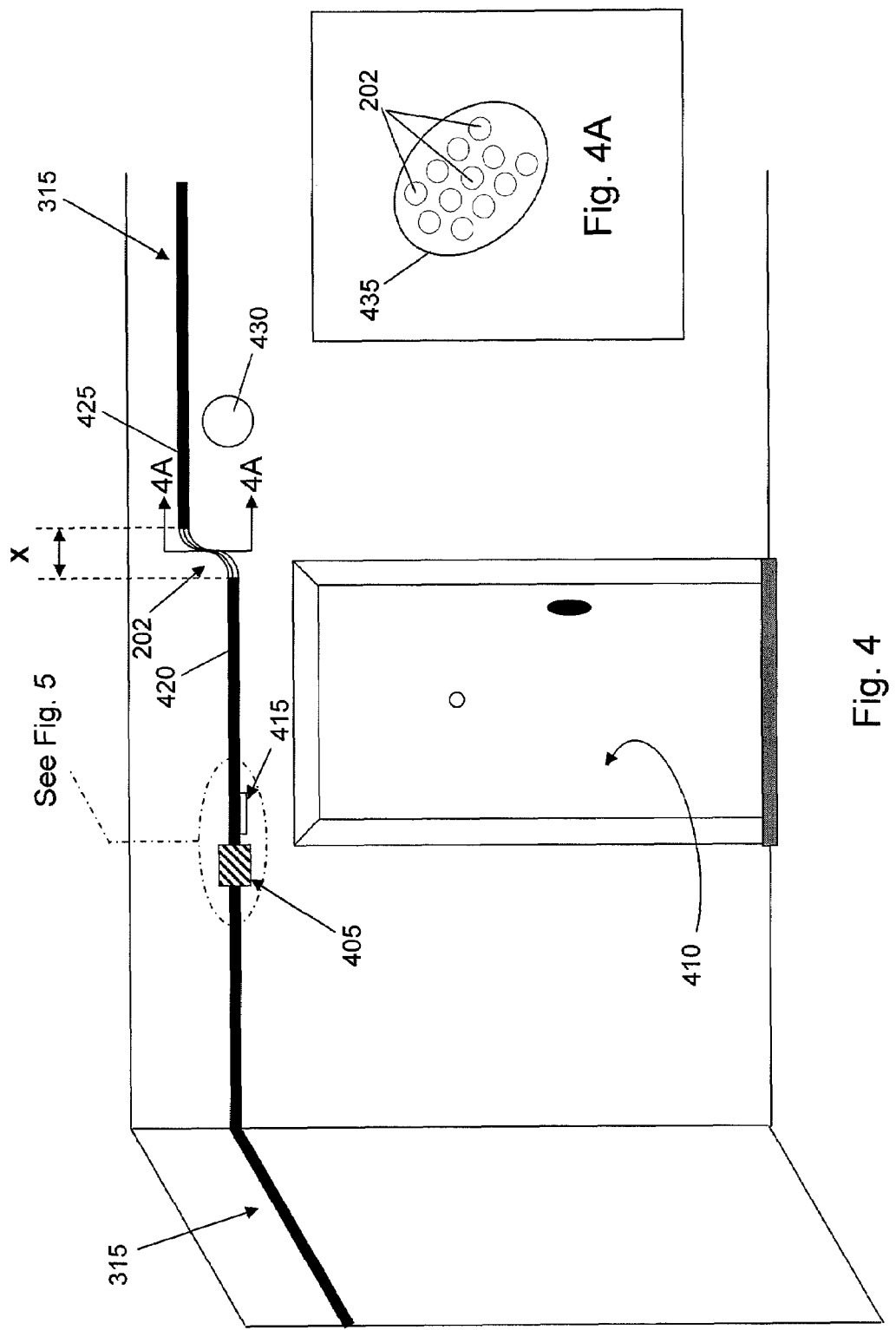
FIG. 4 is a perspective view of a fiber optic drop ribbon installation according to one embodiment showing an offset.
Figure 5:
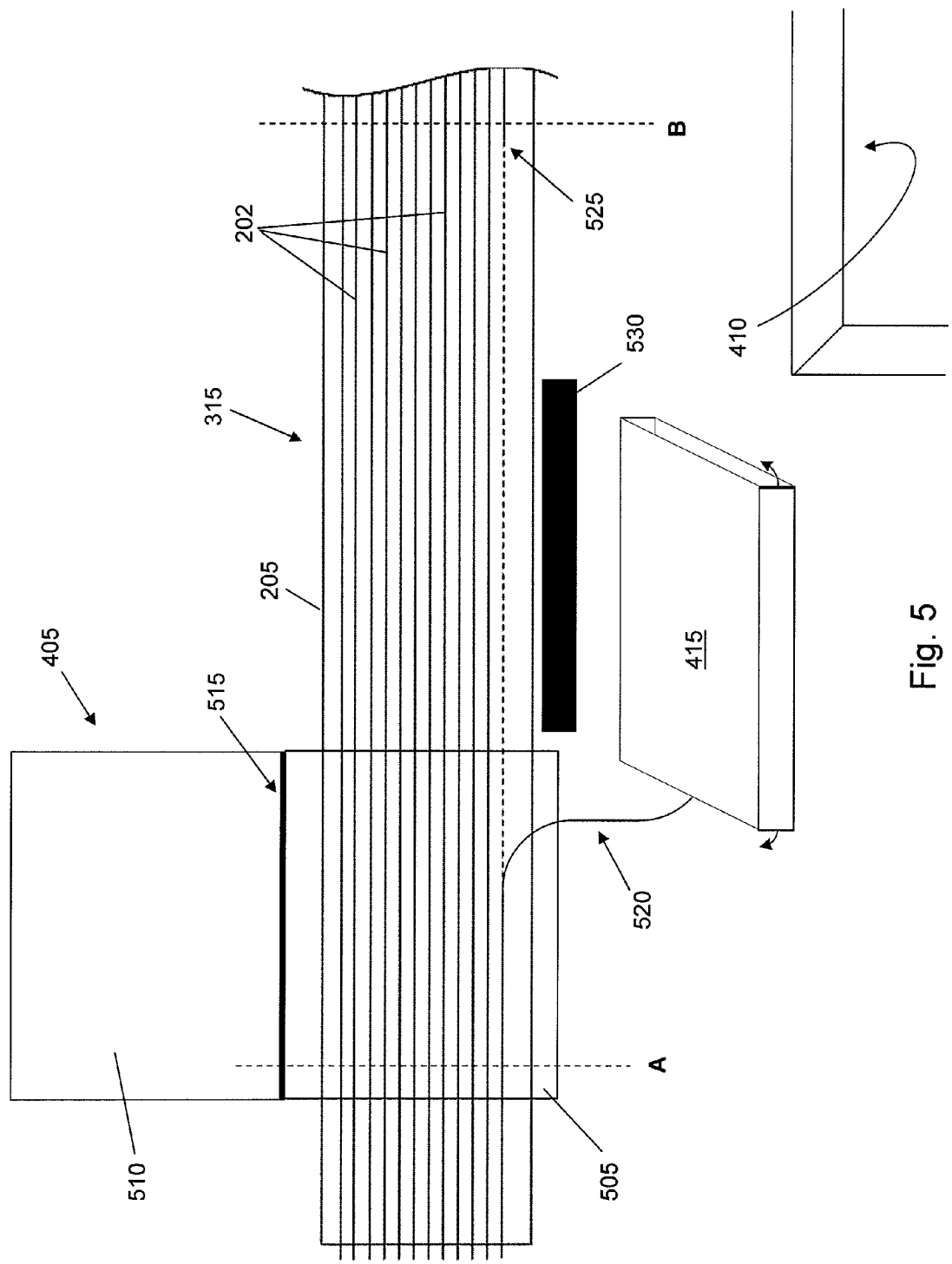
FIG. 5 is a close-up view of the fiber optic drop ribbon installation of FIG. 4 showing a detached optical fiber and a fiber tray.

Referring to FIGS. 4 and 5, the system 300 may include a furcation splint 405 disposed along the fiber optic drop ribbon 315, for example at a location close to a subscriber or resident such as outside a resident's dwelling 410 in an MDU. The furcation splint 405 may include a backer board 505 and a cover board 510 that is generally aligned with the backer board 505 and movably connected to the backer board 505. For example, the cover board 510 may be pivotally connected to one edge of the backer board 505 along a corresponding edge of the cover board 510, forming a joint 515 as illustrated in FIG. 5. The backer board 505 is configured to support the fiber optic drop ribbon 315 and to attach to the structure, such as the wall above a resident's door, such that the backer board 505 is disposed between the structure and the fiber optic drop ribbon 315. The cover board 510 is configured to cover the fiber optic drop ribbon 315 being supported by the backer board 505. As such, the furcation splint 405 is configured to support the fiber optic drop ribbon 315 and to provide access to one or more of the optical fibers 202 of the fiber optic drop ribbon 315 disposed between the backer board 505 and the cover board 510.

For example, the cover board 510 may be pivoted about the joint 515 to provide access to the fiber optic drop ribbon 315 and the optical fibers 202, as can best be seen in FIG. 5, which shows the furcation splint 405 in an "open" position. In a "closed" position, shown in FIG. 4, the respective edges of the cover board 510 and the backer board 505 are generally aligned with each other, and thus may provide additional support and protection to the fiber optic drop ribbon 315 disposed therebetween.

A fiber tray 415 may also be included in the system 300, as shown in FIGS. 4 and 5. The fiber tray 415 may be disposed along the fiber optic drop ribbon 315, such above or otherwise near the doorway leading to a resident's dwelling 410, and may be configured to store one or more of the optical fibers 202 of the fiber optic drop ribbon 315, the optical fiber(s) 202 being at least partially detached from the fiber optic drop ribbon 315.

Referring to FIG. 5, for example, the furcation splint 405 may be "opened" to provide a technician with access to the optical fibers 202 of the fiber optic drop ribbon 315. One of the optical fibers 520 may be cut at a location 525 downstream of the furcation splint 405 and detached from the backing strip 205 of the fiber optic drop ribbon 315. The detached fiber 520 may be used to connect a subscriber, such as the resident of the corresponding dwelling 410, to the fiber optic network. However, if the resident is not yet a subscriber (and therefore is not yet to be connected to the network), the detached end portion of the fiber 520 may be stored in the fiber tray 415 for possible use in the future. In this way, the resident's future fiber optic needs may be considered, and future installations may be facilitated.

The fiber tray 415 may be configured in various shapes and sizes as appropriate to accommodate the desired length of the detached fiber 520 (or even multiple detached fibers 520). For example, the fiber tray 415 may be configured as a rectangular compartment having four sides with opposing openings forming the remaining two sides to provide access to the interior of the tray for storage of the detached fiber 520, as shown in FIG. 5. Furthermore, a receptacle 530 may be included in an appropriate location, such as within a wall close to the furcation splint 405. The receptacle 530 may be configured to hold the fiber tray 415, for example such that the fiber tray 415 fits at least partially within and is supported by the receptacle 530. In this way, the unused detached fiber 520 may be stored in the fiber tray 415, and the fiber tray 415 may be stowed in the receptacle 530 until such time as access to the detached fiber 520 is needed.

In other embodiments, a method for connecting subscribers to a fiber optic network is provided. A backing strip having a first surface, configured to attach to a structure, and an opposed, second surface is initially provided. A number of coated optical fibers are then attached to the second surface of the backing strip, and the optical fibers and the second surface of the backing strip are covered with a cover strip such that the optical fibers are disposed between the backing strip and the cover strip to form a resulting ribbon cable that is attachable to the structure as a single unit. For example, the second surface of the backing strip may have adhesive properties (e.g., coated with an adhesive) such that the optical fibers and the cover strip can adhere to the second surface. Alternatively or in addition to the second surface having adhesive properties, the cover strip may also have adhesive properties such that the cover strip can adhere to the second surface and the optical fibers, thereby holding the optical fibers in place.

In some cases, such as when the ribbon cable is being installed to provide network service to a subscriber, at least a portion of the ribbon cable may be attached to the structure. For example, part of the ribbon cable (such as a certain length of the ribbon cable) may be attached to an interior wall of an apartment building or other MDU. One or more of the optical fibers from the ribbon cable may be spliced to corresponding optical fibers from an upjacketed optical fiber bundle at a furcation point, as previously described and illustrated in FIG. 3.

Furthermore, at least a portion of the cover strip may be removed to access one or more of the optical fibers. For example, a technician installing the ribbon cable may separate a portion of the cover strip from the backing strip by peeling the cover strip away from the second surface of the backing strip to expose one or more of the optical fibers. A furcation splint, such as shown in FIGS. 4 and 5, may be attached to the structure (e.g., the wall) proximate a location of the removal of the portion of the cover strip. For example, referring to FIG. 5, the furcation splint 405 may be attached to the wall close to a resident's dwelling 410. The ribbon cable 315 may then be installed on the furcation splint 405, and the cover strip may be cut at a location A at or near the furcation splint and at a location B downstream (i.e., farther from the network) of the furcation splint 405. In this way, the portion of the cover strip from A to B may be removed from the backing strip 205 to provide access to the optical fibers 202.

Once the optical fibers are accessible, one or more of the optical fibers 202 may be cut at a distance downstream of the fiber optic network, such as at a location 525. Each cut fiber 520 may then be detached from the second surface of the backing strip up to a location of the furcation splint 405, such as shown in FIG. 5. After the optical fiber 520 has been detached and further access to the optical fibers 202 is no longer needed, the cover strip may be at least partially replaced, such as by reattaching the portion of the cover strip that was removed between A and B.

Referring to FIG. 4, a portion of the backing strip and a corresponding portion of the cover strip may also be removed to expose one or more of the optical fibers 202. Furthermore, a first portion 420 of the ribbon cable may be attached at a first location on the structure (e.g., the wall), and a second portion 425 of the ribbon cable may be attached at a second location on the structure. In this way, the first and second portions 420, 425 may be disposed on opposite sides of the exposed optical fibers 202, as shown in FIG. 4, such that the first portion 420 is offset from the second portion 425 in a direction that is generally perpendicular to at least one of the first or second portions 420, 425. Thus, a technician wishing to install the ribbon cable around an obstacle or protrusion of the structure, such as a fire alarm 430 on the wall, may offset a first and second portion of the ribbon cable, as described, to get around the obstacle without disturbing the optical fibers themselves or otherwise impeding the communication signals propagating along the optical fibers.

In providing such an offset, the optical fibers 202 corresponding to the exposed portion (i.e., the portion between the first and second portions 420, 425) may not remain in the same configuration with respect to the other optical fibers of the ribbon cable. For example, instead of maintaining a planar configuration, in which the optical fibers lie generally in the same plane (as illustrated in FIGS. 2, 3, and 5), the optical fibers 202 may rearrange themselves to form a more elliptical configuration, as shown in FIG. 4A. Although the portion between the first and second portions 420, 425) is referred to as the "exposed" portion in this description, such term is only meant to distinguish the portion of optical fibers that is supported by the backing strip and in some cases the cover strip from the portion that is not supported. Thus, in some embodiments, the optical fibers 202 may be bundled within a sheath or polymeric coating 435 that may provide a layer of protection to the optical fibers 202 in the exposed portion, as shown in FIG. 4A, while still allowing the optical fibers 202 to re-arrange themselves, as previously discussed. Such a sheath or coating 435 may form part of the ribbon cable itself (for example, coating the optical fibers and bundling them as a unit that is attached to the backing strip) or may be installed separately along only the exposed portion of the ribbon cable (for example, after a portion of the backing strip has been removed). Furthermore, attaining a non-planar configuration in the exposed portion may facilitate certain offsets in which the distance X between the first and second portions 420, 425 may have necessitated a larger bend radius in each optical fiber 202 had a planar configuration been imposed on the optical fibers 202 (for example, when the distance X is relatively short as compared to the offset).

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. An article comprising:
    a backing strip including a double-sided adhesive tape having a first surface and a second surface, wherein the first surface is configured to attach to a structure;
    a plurality of coated optical fibers supported by the backing strip, wherein the optical fibers are attached to the second surface of the backing strip; and
    a cover strip configured to attach to the second surface of the backing strip;
    wherein the optical fibers are disposed between the backing strip and the cover strip.

2. The article of claim 1, wherein the cover strip comprises at least one of the materials selected from the group consisting of polyester film and cellophane.

3. The article of claim 1, wherein the cover strip is at least partially removable and is configured to provide access to at least one of the optical fibers.

4. The article of claim 3, wherein the cover strip is configured to re-attach to the second surface of the backing strip following at least partial removal of the cover strip.

5. A system comprising:
    an upjacketed optical fiber bundle including at least one coated optical fiber, each optical fiber having a first predefined diameter; and
    a fiber optic drop ribbon connected to the upjacketed optical fiber bundle comprising:
        a backing strip having a first surface and a second surface, wherein the first surface is configured to attach to a structure; and
        a plurality of coated optical fibers, each having a second predefined diameter, that are supported by the backing strip, wherein the optical fibers are attached to the second surface of the backing strip.

6. The system of claim 5 further comprising a furcation section connecting the upjacketed optical fiber bundle to the fiber optic drop ribbon and including:
    a transitional backing strip configured to at least partially support the at least one optical fiber of the upjacketed optical fiber bundle and the optical fibers of the fiber optic drop ribbon;
    a first connector configured to attach the furcation section to the upjacketed optical fiber bundle; and
    a second connector configured to attach the furcation section to the fiber optic drop ribbon;
    wherein the at least one optical fiber having a first diameter is spliced to a corresponding optical fiber having a second diameter, and the furcation section is configured to support the spliced optical fibers at the location of the splice.

7. The system of claim 6, wherein the first and second connectors comprise heat shrunk bands.

8. The system of claim 5, wherein each optical fiber of the upjacketed optical fiber bundle has a diameter that is smaller than the diameter of each optical fiber of the fiber optic drop ribbon.

9. The system of claim 5, wherein the upjacketed optical fiber bundle is configured to be connected to a Fiber Distribution Terminal.

10. The system of claim 9, wherein each optical fiber of the upjacketed optical fiber bundle is configured to be connected to the Fiber Distribution Terminal using a Mechanical Transfer (MT) connector.

11. The system of claim 5, wherein each optical fiber of the upjacketed optical fiber bundle is configured to be connected to a fiber optic network using a Subscription Channel/Angled Physical Contact (SC/APC) connector.

12. The system of claim 5, wherein the fiber optic drop ribbon further comprises a cover strip configured to attach to the second surface of the backing strip.

13. The system of claim 12, wherein the cover strip of the fiber optic drop ribbon comprises at least one of the materials selected from the group consisting of polyester film and cellophane.

14. The system of claim 12, wherein the cover strip of the fiber optic drop ribbon is at least partially removable and is configured to provide access to at least one of the optical fibers of the fiber optic drop ribbon.

15. The system of claim 5 further comprising a furcation splint disposed along the fiber optic drop ribbon and including:
 a backer board configured to support the fiber optic drop ribbon and to attach to a structure, such that the backer board is disposed between the structure and the fiber optic drop ribbon; and
 a cover board generally aligned with the backer board and movably connected to the backer board, wherein the cover board is configured to cover the fiber optic drop ribbon being supported by the backer board;
 wherein the furcation splint is configured to support the fiber optic drip ribbon and to provide access to at least one of the optical fibers of the fiber optic drop ribbon disposed between the backer board and the cover board.

16. The system of claim 5 further comprising a fiber tray disposed along the fiber optic drop ribbon and configured to store an end portion of at least one of the optical fibers of the fiber optic drop ribbon, the end portion of at least one optical fiber being at least partially detached from the fiber optic drop ribbon.

17. A method comprising
 providing a backing strip having a first surface and a second surface, wherein the first surface is configured to attach to a structure;
 attaching a plurality of coated optical fibers to the second surface of the backing strip;
 covering the optical fibers and the second surface of the backing strip with a cover strip such that the optical fibers are disposed between the backing strip and the cover strip to form a resulting article that is attachable to the structure as a single unit;
 attaching at least a portion of the article to the structure; and
 splicing at least one of the optical fibers to a corresponding optical fiber from an upjacketed optical fiber bundle at a furcation point.

18. The method of claim 17 further comprising removing at least a portion of the cover strip to access at least one of the optical fibers.

19. A method comprising:
 providing a backing strip having a first surface and a second surface, wherein the first surface is configured to attach to a structure;
 attaching a plurality of coated optical fibers to the second surface of the backing strip;
 covering the optical fibers and the second surface of the backing strip with a cover strip such that the optical fibers are disposed between the backing strip and the cover strip to form a resulting article that is attachable to the structure as a single unit;
 attaching at least a portion of the article to the structure;
 removing at least a portion of the cover strip to access at least one of the optical fibers;
 attaching a furcation splint to the structure proximate a location of the removal of the portion of the cover strip;
 cutting at least one of the optical fibers at a distance downstream of a fiber optic network and detaching each cut optical fiber from the second surface of the backing strip up to a location of the furcation splint; and
 at least partially replacing the cover strip.

20. The method of claim 19 further comprising removing a portion of the backing strip and a corresponding portion of the cover strip, wherein at least one of the optical fibers is at least partially exposed.

21. A method comprising:
 providing a backing strip having a first surface and a second surface, wherein the first surface is configured to attach to a structure;
 attaching a plurality of coated optical fibers to the second surface of the backing strip;
 covering the optical fibers and the second surface of the backing strip with a cover strip such that the optical fibers are disposed between the backing strip and the cover strip to form a resulting article that is attachable to the structure as a single unit;
 removing a portion of the backing strip and a corresponding portion of the cover strip, wherein at least one of the optical fibers is at least partially exposed; and
 attaching a first portion of the article at a first location on the structure and attaching a second portion of the article at a second location on the structure, wherein the first portion and the second portion are disposed on opposite sides of the exposed optical fibers, and wherein the first portion is offset from the second portion in a direction that is generally perpendicular to at least one of the first or second portions.

\* \* \* \* \*